United States Patent
Tanaka

(10) Patent No.: US 10,587,779 B2
(45) Date of Patent: Mar. 10, 2020

(54) REPRODUCTION COLOR PROFILE CORRECTION DEVICE, REPRODUCTION COLOR PROFILE CORRECTION METHOD, AND COMPUTER-READABLE MEDIUM INCLUDING REPRODUCTION COLOR PROFILE CORRECTION PROGRAM

(71) Applicant: TOPPAN PRINTING CO., LTD., Tokyo (JP)

(72) Inventor: Takaya Tanaka, Tokyo (JP)

(73) Assignee: TOPPAN PRINTING CO., LTD., Tokyo (JP)

(\*) Notice: Subject to any disclaimer, the term of this patent is extended or adjusted under 35 U.S.C. 154(b) by 0 days.

(21) Appl. No.: 16/204,586

(22) Filed: Nov. 29, 2018

(65) Prior Publication Data
US 2019/0098178 A1    Mar. 28, 2019

Related U.S. Application Data

(63) Continuation of application No. PCT/JP2017/019388, filed on May 24, 2017.

(30) Foreign Application Priority Data

Jun. 1, 2016   (JP) ................ 2016-110327

(51) Int. Cl.
  *H04N 1/60*    (2006.01)
  *H04N 1/46*    (2006.01)
  (Continued)

(52) U.S. Cl.
  CPC ........... *H04N 1/6033* (2013.01); *B41J 2/525* (2013.01); *G06F 3/1208* (2013.01); *G06T 1/00* (2013.01);
  (Continued)

(58) Field of Classification Search
  None
  See application file for complete search history.

(56) References Cited

U.S. PATENT DOCUMENTS 6,714,924 B1 * 3/2004 McClanahan .......... B44D 3/003
                                              382/156
9,443,175 B2 * 9/2016 Arizono .................. H04N 1/52
(Continued)

FOREIGN PATENT DOCUMENTS

JP    2006-329753    12/2006
JP    2007-516663    6/2007
(Continued)

OTHER PUBLICATIONS

Ito, Takashi, JP-2011-223434 A English Translation, "Color Conversion Table Creation Method, Color Conversion Table Creation Program, and Printer", par 0006, 0020, 0031-0033 (Year: 2011).*
(Continued)

*Primary Examiner* — Miya J Williams

(57) ABSTRACT

A reproduction color profile correction system includes, a differential colorimetric value calculator which calculates a differential colorimetric value that is a difference between a predicted colorimetric value and a measured colorimetric value, the predicted colorimetric value being a colorimetric value of a predicted reproduction color corresponding to a process ink combination of an ink combination, and a measured colorimetric value being a colorimetric value obtained by measuring a reproduction color in a color chart corresponding to the process ink combination, and a colorimetric value corrector which corrects, by using the differential colorimetric value, a predicted colorimetric value of a reproduction color reproduced by the ink combination.

8 Claims, 9 Drawing Sheets

(51) Int. Cl.
*B41J 2/525* (2006.01)
*G06T 1/00* (2006.01)
*G06F 3/12* (2006.01)

(52) U.S. Cl.
CPC .................. *H04N 1/46* (2013.01); *H04N 1/60* (2013.01); *H04N 1/6011* (2013.01); *G06F 3/1245* (2013.01); *H04N 1/6008* (2013.01)

(56) References Cited

U.S. PATENT DOCUMENTS

| | | | |
|---|---|---|---|
| 2008/0111998 A1* | 5/2008 | Edge | H04N 1/52 358/1.9 |
| 2009/0021807 A1* | 1/2009 | Horita | B41F 33/0036 358/518 |
| 2011/0032545 A1* | 2/2011 | Mestha | H04N 1/40006 358/1.9 |

FOREIGN PATENT DOCUMENTS

| | | | |
|---|---|---|---|
| JP | 2011-223434 | | 11/2011 |
| JP | 2011223434 A | * | 11/2011 |
| WO | WO 2005/043884 A1 | | 5/2005 |

OTHER PUBLICATIONS

International Search Report dated Jul. 18, 2017 in corresponding International Patent Application No. PCT/JP2017/019388.
Written Opinion of the International Searching Authority dated Jul. 18, 2017 in corresponding International Patent Application No. PCT/JP2017/019388.

\* cited by examiner

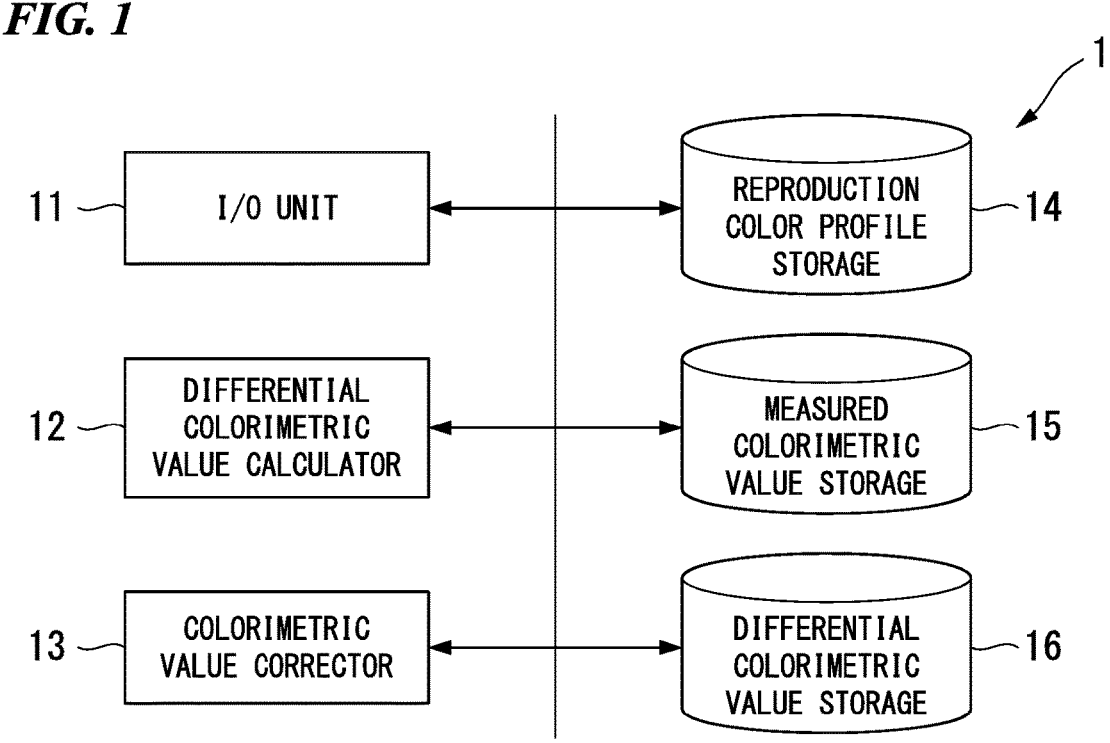

YELLOWISH GREEN

| SPOT COLOR INK CONTROL VALUE | 0 | 20 | 40 | 60 | 80 | 100 |
|---|---|---|---|---|---|---|
| ADJUSTMENT FACTOR | 1.00 | 0.98 | 0.96 | 0.94 | 0.91 | 0.88 |

BROWN

| SPOT COLOR INK CONTROL VALUE | 0 | 20 | 40 | 60 | 80 | 100 |
|---|---|---|---|---|---|---|
| ADJUSTMENT FACTOR | 1.00 | 0.88 | 0.75 | 0.60 | 0.33 | 0.03 |

REPRODUCTION COLOR PROFILE CORRECTION DEVICE, REPRODUCTION COLOR PROFILE CORRECTION METHOD, AND COMPUTER-READABLE MEDIUM INCLUDING REPRODUCTION COLOR PROFILE CORRECTION PROGRAM

CROSS REFERENCE TO RELATED APPLICATIONS

This application is a continuation application based on a PCT Patent Application No. PCT/JP2017/019388, filed May 24, 2017, whose priority is claimed on Japanese Patent Application No. 2016-110327 filed Jun. 1, 2016, the entire content of which are hereby incorporated by reference.

BACKGROUND OF THE INVENTION

Field of the Invention

The present invention relates to a reproduction color profile correction device, a reproduction color profile correction method, and a computer-readable medium including the reproduction color profile correction program which are used for spot color direct digital color proofer (DDCP).

Description of the Related Art

Generally, a reproduction color profile for colors in printed materials output from an output device such as a printer or a printing machine is created in order to support the output device and perform color control in a color space of each output device (refer to Published Japanese Translation No. 2007-516663 of the PCT International Publication and Japanese Unexamined Patent Application, First Publication No. 2006-329753, for example). At the time of creating such a reproduction color profile, a color chart formed of a predetermined combination of control values of each ink is output from the output device for which the profile is to be generated.

Then, in the color chart, color measurement is performed for each combination of control values of the inks, and a reproduction color profile is created by acquiring a correspondence relation between a measured colorimetric value that is a colorimetric value obtained from measurement and each combination of control values of an ink corresponding to the colorimetric value.

In a reproduction color profile corresponding to a process ink, a reproduction color with a combination of generally used process inks, for example, C (Cyan), M (Magenta), Y (Yellow), and K (Black) is normally controlled. The reproduction color profile corresponding to the process ink is created by: preliminarily printing a color chart of a combination of control values of a process ink of each color component; and obtaining measured colorimetric values by performing measurement.

On the other hand, in a case of using a spot color ink in combination with the process ink, regarding the spot color, a color of the spot color to be used is determined per printed material. Due to this, in the case of combining the spot color ink with the process ink combination, unlike the case of using only the process ink combination, it is not possible to preliminarily print a color chart and acquire measured colorimetric values from the printed color chart. In other words, unlike the case of using only the process ink combination, it is practically impossible to create a reproduction color profile by acquiring measured colorimetric values from an actually printed color chart in the case of combining the spot color ink.

Therefore, in the case of using the process ink in combination with the spot color ink, a colorimetric value of a reproduction color reproduced by this combination is predicted, and the predicted colorimetric value of the prediction result is used to generate a reproduction color profile. In such prediction of the reproduction color, for example, parameters such as a measured colorimetric value of a solid spot color and dot gain of a halftone dot are input to a reproduction color prediction model (or color prediction model) of a color prediction system, and a predicted colorimetric value of the reproduction color reproduced by combining spot color inks or combining a process ink with a spot color ink is obtained.

Then, a reproduction color profile adaptable to a printed material by a combination of the process ink and the spot color ink is generated on the basis of the predicted colorimetric value predicted by the color prediction system.

SUMMARY OF THE INVENTION

However, a color prediction system also obtains a predicted colorimetric value from a reproduction color prediction model by using a measured colorimetric value of the solid process ink also for a combination of only process inks. Since this predicted colorimetric value is obtained from limited information by using the reproduction color prediction model, the predicted colorimetric value may not conform to a measured colorimetric value obtained by actually performing measurement on a color chart.

In other words, for a reproduction color profile created from the predicted value, it can be considered that accuracy of a reproduction color is lower than that in a reproduction color profile created from measured colorimetric values obtained from a color chart.

Accordingly, to improve the accuracy of the reproduction color profile, a process is performed to replace the predicted colorimetric value of a combination of only process inks obtained from a reproduction color prediction model with the measured colorimetric value already obtained by performing measurement in the color chart.

At this point, correction with the measured colorimetric value cannot be reflected on a predicted colorimetric value of a reproduction color obtained by combining a process ink and a spot color ink, and the colorimetric value remains as the predicted colorimetric value predicted by the reproduction color prediction model.

As a result, since the predicted colorimetric value predicted by the reproduction color prediction model and the measured colorimetric value obtained from the color chart coexist in the same reproduction color profile, there is no conformity between these colorimetric values in the reproduction color profile. In other words, in a correspondence relation between an ink combination and a colorimetric value, the measured colorimetric value of the process ink is not reflected in the reproduction color obtained by combining the spot color ink and the process ink. As a result, the reproduction color turns out to be an unnatural color compared to the reproduction color obtained by combining only the process inks, and there is no conformity.

FIG. 9 illustrates an evaluation chart to compare a reproduction color of a spot color ink with a reproduction color of a process ink. FIG. 9 illustrates an image in which colorimetric values are reproduced at the time of performing printing with a process ink including a color component C, a color component M, and a color component Y in a combination of the same control value (halftone tint, for example, a dot percentage is C==M=Y=30%). In a region A in an upper half of the chart in FIG. 9, colorimetric values in a case where a spot color ink (e.g., yellowish green, brown, or the like) is sequentially increased from 1%→5%→10%→20%→30%→40%→50%→70%→80%→100% and then included in a combination of halftone tint of the process ink are reproduced. In a region B, colorimetric values are directly reproduced by the combination of the halftone tint of the process inks.

In a case where correction is made to the chart illustrated in FIG. 9 by using a measured colorimetric value of the process ink, the colorimetric value can be corrected from a predicted colorimetric value to the measured colorimetric value in the region B because the reproduction color in the region B is reproduced only by the combination of the process inks, and it is possible to correctly represent the colorimetric value by the combination of the process inks.

On the other hand, since the region A provides the colorimetric values of the reproduction colors reproduced by combinations each combining the process ink and the spot color ink, simulation for a predicted colorimetric value corresponding to a measured colorimetric value of the process ink cannot be performed, and the colorimetric values remain as the predicted colorimetric values initially obtained from a reproduction color prediction model.

As a result, as already described above, in a case where a control value of the spot color ink is low, such as 1% in the region A, a colorimetric value is nearly a colorimetric value of the reproduction color reproduced by substantially only a process ink combination and also is the colorimetric value similar to the colorimetric value in the region B. However, since the region A represents the reproduction colors reproduced by the combinations each combining the process ink and the spot color ink, correction corresponding to the measured colorimetric values is not made to the colorimetric values, and the colorimetric values corresponding to the combination of the process ink remain as the predicted colorimetric values. For this reason, the colorimetric value in the region A in the case where the control value is 1% differs from the colorimetric value in the region B although these colorimetric values should be almost similar to each other, and the reproduction color turns out to be an unnatural color when compared.

The present invention is made in view of the above-described situations and provides a reproduction color profile correction device, a reproduction color profile correction method, and a program, in which correction that can achieve conformity between a reproduction color in a case of using only process ink and a reproduction color in a case of combining a process ink and a spot color ink can be performed for a reproduction color profile created from predicted colorimetric values by using measured colorimetric values acquired from a color chart created by only a process ink combination.

A reproduction color profile correction device according to the present invention is a reproduction color profile correction device which corrects a colorimetric value of a reproduction color in a reproduction color profile, in which the reproduction color is reproduced by an ink combination including: a process ink combination that is a combination of control values of process inks; and a spot color ink combination that is a combination of control values of a spot color ink. The reproduction color profile correction device includes: a differential colorimetric value calculator which calculates a differential colorimetric value that is a difference between a predicted colorimetric value and a measured colorimetric value, the predicted colorimetric value being a colorimetric value of a predicted reproduction color corresponding to the process ink combination in the ink combination, and the measured colorimetric value being a colorimetric value obtained by measuring a reproduction color in a color chart corresponding to the process ink combination; and a colorimetric value corrector which corrects, by using the differential colorimetric value, a predicted colorimetric value of a reproduction color reproduced by the ink combination.

The reproduction color profile correction device according to the present invention further includes: an inclusive region extractor which extracts, for each dot percentage of a spot color ink, an inclusive region including colorimetric values of the process ink combination having different control values of respective process inks in the ink combination, the colorimetric values being distributed in a predetermined color space; and an adjustment factor calculator which calculates, for each control value of the spot color ink, an adjustment factor to be multiplied by the differential colorimetric value on the basis of a size of the inclusive region.

In the reproduction color profile correction device according to the present invention, the colorimetric value corrector corrects the predicted colorimetric value of the spot color ink having the spot color ink combination by multiplying the differential colorimetric value by the adjustment factor corresponding to the spot color ink combination.

In the reproduction color profile correction device according to the present invention, the adjustment factor calculator calculates the adjustment factor by dividing a size of an inclusive region for each dot percentage of the spot color ink by a reference value while setting, as the reference value, a size of an inclusive region in a case where a dot percentage of the spot color ink is "0", and the size of the inclusive region includes colorimetric values distributed in a predetermined color space and belonging to combinations having different dot percentages of process inks.

In the reproduction color profile correction device according to the present invention, the size of the inclusive region is volume of the inclusive region in the predetermined color space.

In the reproduction color profile correction device according to the present invention, the size of the inclusive region is area of a projected plane when the inclusive region in the predetermined color space is projected on a two-dimensional plane.

In the reproduction color profile correction device according to the present invention, the size of the inclusive region is a length of a diagonal line of a rectangular parallelepiped including distribution of the colorimetric values in the predetermined color space.

A reproduction color profile correction method according to the present invention is a reproduction color profile correction method which corrects a colorimetric value of a reproduction color in a reproduction color profile, in which the reproduction color is reproduced by an ink combination including: a process ink combination that is a combination of control values of process inks; and a spot color ink combination that is a combination of control values of a spot color ink. The reproduction color profile correction method includes: a differential colorimetric value calculator calculating a differential colorimetric value that is a difference between a predicted colorimetric value and a measured colorimetric value, the predicted colorimetric value being a colorimetric value of a predicted reproduction color corresponding to the process ink combination in the ink combination, and the measured colorimetric value being a colorimetric value obtained by measuring a reproduction color in a color chart corresponding to the process ink combination; and a colorimetric value corrector correcting, by using the differential colorimetric value, a predicted colorimetric value of a reproduction color reproduced by the ink combinations.

A program according to the present invention is a reproduction color profile correction program causing a computer to function as a reproduction color profile correction system which corrects a colorimetric value of a reproduction color in a reproduction color profile, in which the reproduction color is reproduced by an ink combination including: a process ink combination that is a combination of control values of process inks; and a spot color ink combination that is a combination of control values of a spot color ink. The reproduction color profile correction program causes the computer to execute the reproduction color profile correction method including: calculating a differential colorimetric value that is a difference between a predicted colorimetric value and a measured colorimetric value, the predicted colorimetric value being a colorimetric value of a predicted reproduction color corresponding to the process ink combination of the ink combination, and the measured colorimetric value being a colorimetric value obtained by measuring a reproduction color in a color chart corresponding to the process ink combination; and correcting, by using the differential colorimetric value, a predicted colorimetric value of a reproduction color reproduced by the ink combinations.

A computer-readable medium according to the present invention includes a reproduction color profile correction program causing a computer to function as a reproduction color profile correction system which corrects a colorimetric value of a reproduction color in a reproduction color profile, in which the reproduction color is reproduced by an ink combination including: a process ink combination that is a combination of control values of process inks; and a spot color ink combination that is a combination of control values of a spot color ink. The reproduction color profile correction program causes the computer to execute the reproduction color profile correction method including: calculating a differential colorimetric value that is a difference between a predicted colorimetric value and a measured colorimetric value, the predicted colorimetric value being a colorimetric value of a predicted reproduction color corresponding to the process ink combination of the ink combination, and the measured colorimetric value being a colorimetric value obtained by measuring a reproduction color in a color chart corresponding to the process ink combination; and correcting, by using the differential colorimetric value, a predicted colorimetric value of a reproduction color reproduced by the ink combinations.

As described above, according to the present invention, it is possible to provide a reproduction color profile correction device, a reproduction color profile correction method, and a program, in which correction that can achieve conformity between a reproduction color in a case of using only process ink and a reproduction color in a case of combining a process ink and a spot color ink can be performed for a reproduction color profile created from predicted colorimetric values by using measured colorimetric values acquired from a color chart created by only a process ink combination.

BRIEF DESCRIPTION OF THE DRAWINGS

FIG. 1 is a block diagram illustrating an exemplary configuration of a reproduction color profile correction system 1 according to a first embodiment of the present invention.

FIG. 2 is a diagram illustrating exemplary constituents of a differential colorimetric value table stored in a differential colorimetric value storage 16.

DETAILED DESCRIPTION OF THE PREFERRED EMBODIMENTS

Figure 3:
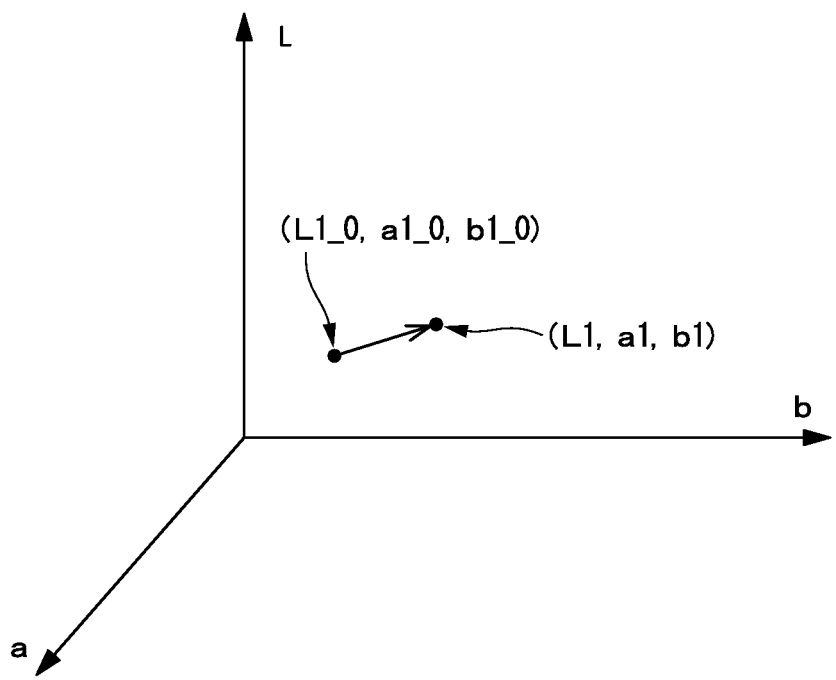
FIG. 3 is a diagram to describe correction for a colorimetric value in a Lab color space according to the present embodiment.

In an embodiment of the present invention, a color prediction table constituting a reproduction color profile provides colorimetric values to be reproduced in printing by respective combinations corresponding to grid points obtained by sectioning control values (such as dot percentages) at equal intervals, and the control values are to control respective ink gradations in a channel of a process ink and a channel of a spot color ink. Hereinafter, a process ink combination represents a combination of control values of inks of respective color components (CMYK) in the process ink. A spot color ink combination represents a combination of control values of one or two or more spot color inks. An ink combination represents a combination of a process ink combination and a spot color ink combination.

Here, for colorimetric values of process ink combinations, many combinations of control values are printed as a color chart, and the colorimetric values corresponding to the respective combinations in the color chart (hereinafter also referred to as a chart) are measured as measured colorimetric values. However, in a case where a spot color ink combination is included, there is no color chart printed by an ink combination including a process ink combination and the spot color ink combination. Accordingly, in a case where the spot color ink combination is included as already described above, a predicted colorimetric value to be reproduced in printing by an ink combination corresponding to a grid point of each control value in each of the channel of the process ink and the channel of the spot color ink is acquired by performing simulation using a general reproduction color prediction model.

First Embodiment

Hereinafter, a first embodiment of the present invention will be described with reference to the drawings.

FIG. 1 is a block diagram illustrating an exemplary configuration of a reproduction color profile correction system (reproduction color profile correction device) 1 according to a first embodiment of the present invention.

In FIG. 1, the reproduction color profile correction system 1 includes an I/O unit 11, a differential colorimetric value calculator 12, a colorimetric value corrector 13, a reproduction color profile storage 14, a measured colorimetric value storage 15, and a differential colorimetric value storage 16. Hereinafter, in the present embodiment, a space in which colorimetric values are indicated will be described as an L*a*b* color space.

The I/O unit 11 reads a reproduction color profile acquired from predicted colorimetric values supplied from an external device, and writes and stores the same in the reproduction color profile storage 14. In the present embodiment, the reproduction color profile is generated by, for example, predicted colorimetric values acquired from simulation using a reproduction color prediction model, and is formed of a table (reproduction color profile table) in which an ink combination including a process ink combination including CMYK and a spot color ink combination corresponds to a predicted colorimetric value of a reproduction color reproduced by the ink combination. In the present embodiment, the reproduction color prediction model may be any model with which the above-described predicted colorimetric values of the ink combination can be obtained by simulation.

Additionally, the I/O unit 11 reads measured colorimetric values (measured colorimetric value table described later) supplied from an external device, and writes and stores the same in the measured colorimetric value storage 15. A measured colorimetric value in the present embodiment is a colorimetric value measured for each process ink combination from a reproduction color chart obtained by actually printing a process ink combination of control values of a process ink of each of CMYK. The measured colorimetric values are supplied as a measured colorimetric value table in which the combination of the control values of each of CMYK is written to correspond to the measured colorimetric values measured from the chart of this combination. Furthermore, the I/O unit 11 outputs a control command supplied from the outside to each of the functional components in the reproduction color profile correction system 1.

The differential colorimetric value calculator 12 sequentially retrieves, from the measured colorimetric value table in the measured colorimetric value storage 15, each of a measured colorimetric value and a process ink combination corresponding to the measured colorimetric value (combination of control values of each process ink). Then, the differential colorimetric value calculator 12 searches the reproduction color profile table in the reproduction color profile storage 14 for an ink combination including only the same process ink combination as this process ink combination. Here, the ink combination including only the process ink combination indicates an ink combination in which a control value of the spot color ink is "0". The differential colorimetric value calculator 12 retrieves, from the reproduction color profile table, a predicted colorimetric value of the process ink combination obtained through the search. The differential colorimetric value calculator 12 subtracts the predicted colorimetric value from the measured colorimetric value as described below to calculate a differential colorimetric value that is a difference between the measured colorimetric value and the predicted colorimetric value.

Differential Predicted Value$(\Delta L_1, \Delta a_1, \Delta b_1)$=Measured Colorimetric Value$(L_1, a_1, b_1)$−Predicted Colorimetric Value$(L_{1\_0}, a_{1\_0}, b_{1\_0})$ Here, $\Delta L_1 = L_1 - L_{1\_0}$, $\Delta a = a_1 - a_{1\_0}$, and $\Delta b = b_1 - b_{1\_0}$.

The differential colorimetric value calculator 12 correlates the calculated differential colorimetric value to the process ink combination together with each of the measured colorimetric value and the predicted colorimetric value, and stores the same in the differential colorimetric value table in the differential colorimetric value storage 16.

FIG. 2 is a diagram illustrating exemplary constituents of a differential colorimetric value table stored in the differential colorimetric value storage 16. In the differential colorimetric value table, a process ink combination and each of a measured colorimetric value, a predicted colorimetric value, and a differential colorimetric value which correspond to the process ink combination are stored in a paired manner.

In other words, a differential colorimetric value that is a difference between a measured colorimetric value and a predicted colorimetric value is calculated and stored for each process ink combination, that is, each combination of control values of the process inks for the respective CMYK.

Returning to FIG. 1, the colorimetric value corrector 13 sequentially retrieves, from the differential colorimetric value table in the differential colorimetric value storage unit 16, a process ink combination and a differential colorimetric value $(L_1, a_1, b_1)$ corresponding to the process ink combination. Then, the colorimetric value corrector 13 detects, from the reproduction color profile table in the reproduction color profile storage 14, an ink combination including the same process ink combination as the retrieved process ink combination. The colorimetric value corrector 13 retrieves a predicted colorimetric value $(L_{1\_n}, a_{1\_n}, b_{1\_n})$ of each detected ink combination, and adds a differential colorimetric value of the process ink combination to the retrieved predicted colorimetric value $(L_{1\_n}, a_{1\_n}, b_{1\_n})$. The colorimetric value corrector 13 corrects the predicted colorimetric value by overwriting the predicted colorimetric value ($L_{1\_n}$, $a_{1\_n}$, $b_{1\_n}$) subjected to the addition in the reproduction color profile table with a corrected colorimetric value ($L_{1\_n}'$, $a_{1\_n}'$, $b_{1\_n}'$) calculated by the addition. Here, $L_{1\_n}'=L_{1\_n}+\Delta L_1$, $a_{1\_n}'=a_{1\_n}+\Delta a_1$, and $b_{1\_n}'=b_{1\_n}+\Delta b_1$. Furthermore, n represents an integer from 1 to m, and m represents the number of ink combinations including the same process ink combination.

FIG. 3 is a diagram to describe correction for a colorimetric value in the L*a*b* color space according to the present embodiment. In FIG. 3, a differential colorimetric value ($\Delta L_1$, $\Delta a_1$, $\Delta b_1$) that is a difference between a measured colorimetric value ($L_1$, $a_1$, $b_1$) and a predicted colorimetric value ($L_{1\_0}$, $a_{1\_0}$, $b_{1\_0}$) is calculated. The differential colorimetric value ($\Delta L_1$, $\Delta a_1$, $\Delta b_1$) represents a differential vector between a coordinate point of the predicted colorimetric value ($L_{1\_0}$, $a_{1\_0}$, $b_{1\_0}$) and a coordinate point of the measured colorimetric values ($L_1$, $a_1$, $b_1$) in the L*a*b* color space. Here, the predicted colorimetric value ($L_{1\_0}$, $a_{1\_0}$, $b_{1\_0}$) represents a predicted colorimetric value of a spot color ink combination in an ink combination, in which a control value of a spot color ink is "0". In other words, the predicted colorimetric value ($L_{1\_0}$, $a_{1\_0}$, $b_{1\_0}$) includes the same ink combination (only a process ink combination) as a process ink combination of the measured colorimetric values ($L_1$, $a_1$, $b_1$) measured in a color chart.

Consequently, the colorimetric value corrector 13 corrects, by using the differential colorimetric value ($\Delta L_1$, $\Delta a_1$, $\Delta b_1$), a predicted colorimetric value of an ink combination including the same process ink combination as the process ink combination to a corrected colorimetric value. In other words, when the process ink combination is the same, the colorimetric value corrector 13 performs correction by using the differential colorimetric value ($\Delta L_1$, $\Delta a_1$, $\Delta b_1$), including correction for a predicted colorimetric value of each ink combination in which the control value of the spot color ink is not "0".

Figure 4:
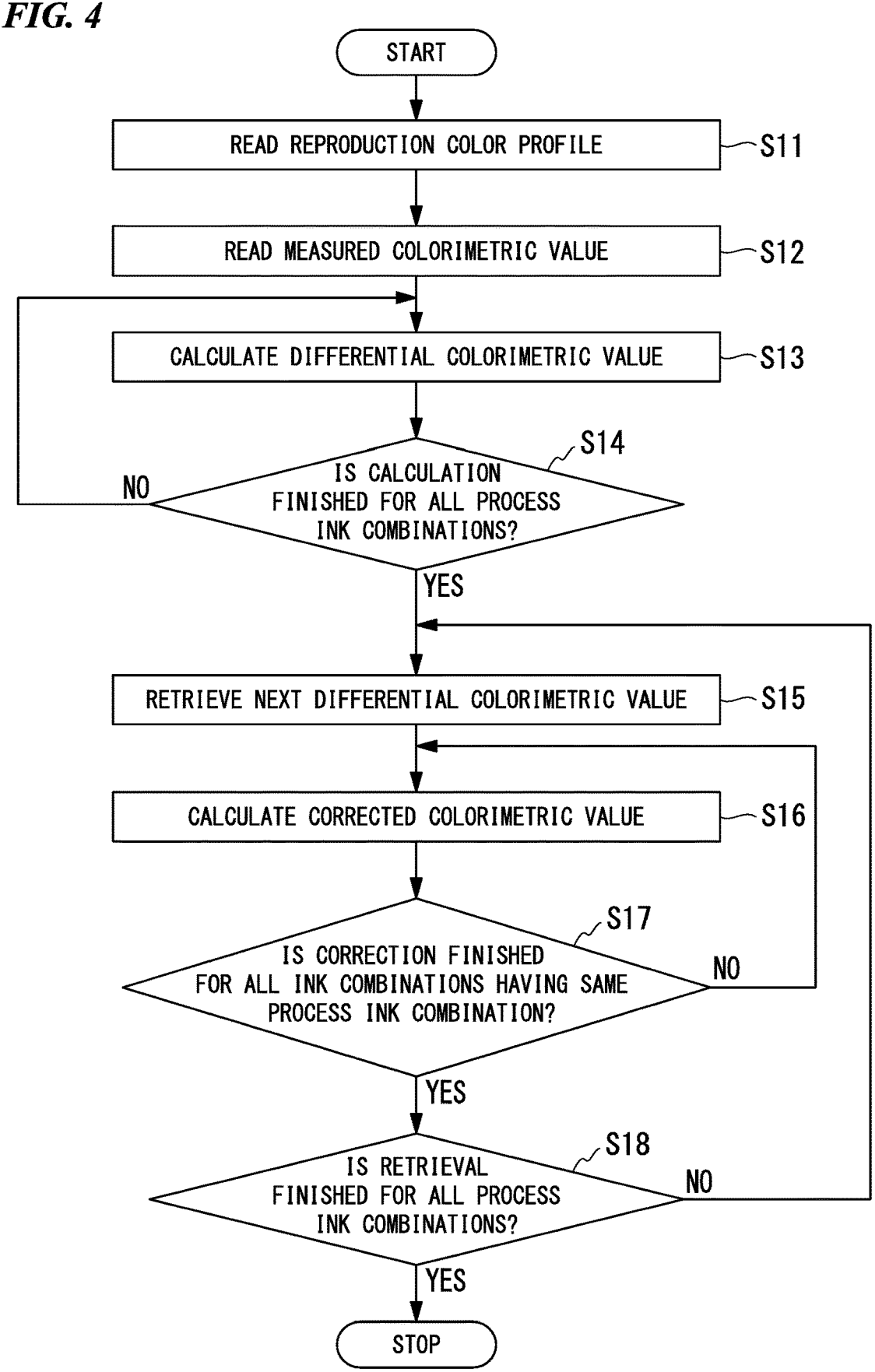
FIG. 4 is a flowchart illustrating an exemplary correcting operation for a reproduction color profile according to the first embodiment.

FIG. 4 is a flowchart illustrating exemplary correcting operation for a reproduction color profile according to the first embodiment.

Step S11:

The I/O unit 11 writes and stores, in the reproduction color profile storage 14, a reproduction color profile (reproduction color profile table) supplied from the outside.

Step S12:

The I/O unit 11 writes and stores, in the measured colorimetric value storage 15, each of measured colorimetric values obtained by measuring reproduction colors in a color chart for each process ink combination in the chart. Here, the I/O unit 11 writes and stores, in the measured colorimetric value storage 15, a measured colorimetric value table in which a process ink combination to reproduce a reproduction color and a measured colorimetric value of the reproduction color reproduced by the process ink combination are paired.

Step S13:

The differential colorimetric value calculator 12 retrieves, in the written order from the measured colorimetric value table in the measured colorimetric value storage 15, a process ink combination and a measured colorimetric value ($L_1$, $a_1$, $b_1$) of a reproduction color reproduced by the process ink combination.

Then, the differential colorimetric value calculator 12 detects, from the reproduction color profile table in the reproduction color profile storage 14, an ink combination including the same process ink combination as the mentioned process ink combination and having a control value "0" of a spot color ink combination.

The differential colorimetric value calculator 12 retrieves, from the reproduction color profile table, a stored predicted colorimetric value ($L_{1\_0}$, $a_{1\_0}$, $b_{1\_0}$) corresponding to the detected ink combination.

The differential colorimetric value calculator 12 subtracts the predicted colorimetric value ($L_{1\_0}$, $a_{1\_0}$, $b_{1\_0}$) from the measured colorimetric value ($L_1$, $a_1$, $b_1$) to calculate a differential colorimetric value ($\Delta L_1$, $\Delta a_1$, $\Delta b_1$).

Then, the differential colorimetric value calculator 12 correlates the differential colorimetric value ($\Delta L_1$, $\Delta a_1$, $\Delta b_1$) to each of the process ink combination, measured colorimetric value ($L_1$, $a_1$, $b_1$), and predicted colorimetric value ($L_{1\_0}$, $a_{1\_0}$, $b_{1\_0}$), and writes and stores the correlated data in the differential colorimetric value table in the differential colorimetric value storage 16.

Step S14:

The differential colorimetric value calculator 12 determines whether calculation of differential colorimetric values corresponding to all of process ink combinations written in the measured colorimetric value table in the measured colorimetric value storage 15 is finished. At this point, in a case where calculation of the differential colorimetric values corresponding to all of the process ink combinations written in the measured colorimetric value table is finished, the differential colorimetric value calculator 12 proceeds to step S15. On the other hand, in a case where calculation of the differential colorimetric values corresponding to all of the process ink combinations written in the measured colorimetric value table is not finished, the differential colorimetric value calculator 12 proceeds to step S13.

Step S15:

The colorimetric value corrector 13 retrieves, from the differential colorimetric value table in the differential colorimetric value storage 16, a process ink combination and a differential colorimetric value corresponding to the process ink combination in the written order.

Step S16:

Next, the colorimetric value corrector 13 detects, from the reproduction color profile table in the reproduction color profile storage 14, an ink combination including the same process ink combination as a target process ink combination. Here, the target process ink combination indicates a process ink combination retrieved in the written order from the differential colorimetric value table in the differential colorimetric value storage 16.

The colorimetric value corrector 13 detects an ink combination having the same process ink combination as the target process ink combination in the written order in the reproduction color profile table.

Then, the colorimetric value corrector 13 retrieves, from the reproduction color profile table, a predicted colorimetric value ($L_{1\_n}$, $a_{1\_n}$, $b_{1\_n}$) corresponding to the detected ink combination.

The colorimetric value corrector 13 adds the differential colorimetric values ($\Delta L_1$, $\Delta a_1$, $\Delta b_1$) to the retrieved predicted colorimetric value ($L_{1\_n}$, $a_{1\_n}$, $b_{1\_n}$) to calculate a corrected colorimetric value ($L_{1\_n}'$, $a_{1\_n}'$, $b_{1\_n}'$). Here, the colorimetric value corrector 13 corrects the reproduction color profile table by overwriting the predicted colorimetric value ($L_{1\_n}$, $a_{1\_n}$, $b_{1\_n}$) in the reproduction color profile table with the corrected colorimetric value ($L_{1\_n}'$, $a_{1\_n}'$, $b_{1\_n}'$).

Step S17:

The colorimetric value corrector 13 determines whether correction is finished for all of the predicted colorimetric values of the ink combinations each having the same process ink combination as the target process ink combination in the reproduction color profile table.

At this point, in a case where correction is finished for all of the predicted colorimetric values of the ink combinations each having the same process ink combination as the target process ink combination, the colorimetric value corrector 13 proceeds to step S18. On the other hand, in a case where correction is not finished for all of the predicted colorimetric values of the ink combinations each having the same process ink combination as the target process ink combination, the colorimetric value corrector 13 proceeds to step S16 and corrects a predicted colorimetric value of a remaining ink combination in the reproduction color profile table.

Step S18:

The colorimetric value corrector 13 determines whether retrieval of a differential colorimetric value is finished for all of process ink combinations in the differential colorimetric value table in the differential colorimetric value storage 16.

Then, in a case where retrieval of a differential colorimetric value is finished for all of the process ink combinations in the differential colorimetric value table, the colorimetric value corrector 13 finishes the correction process for the reproduction color profile. On the other hand, in a case where retrieval of a differential colorimetric value is not finished for all of the process ink combinations in the differential colorimetric value table, the colorimetric value corrector 13 proceeds to step S15 to perform correction process for a predicted colorimetric value by using a differential colorimetric value in the next process ink combination.

As described above, in the present embodiment, a differential colorimetric value is acquired from: a measured colorimetric value obtained by measuring a reproduction color reproduced by a process ink combination in a color chart; and a predicted colorimetric value of the same process ink combination as the process ink combination and having a control value "0" of a spot color ink. According to the present embodiment, since a predicted colorimetric value of the same process ink combination as a process ink combination of a measured colorimetric value is corrected by a calculated differential colorimetric value, it is possible to apply the correction of the predicted colorimetric value in the ink combination by using the measured colorimetric value of the process ink combination to an ink combination in which a control value of the spot color ink combination is not "0", and correction that can achieve conformity between a case of combining only process inks and a case of combining a process ink and a spot color ink can be performed.

Second Embodiment

Hereinafter, a second embodiment of the present invention will be described with reference to the drawings.

Figure 5:
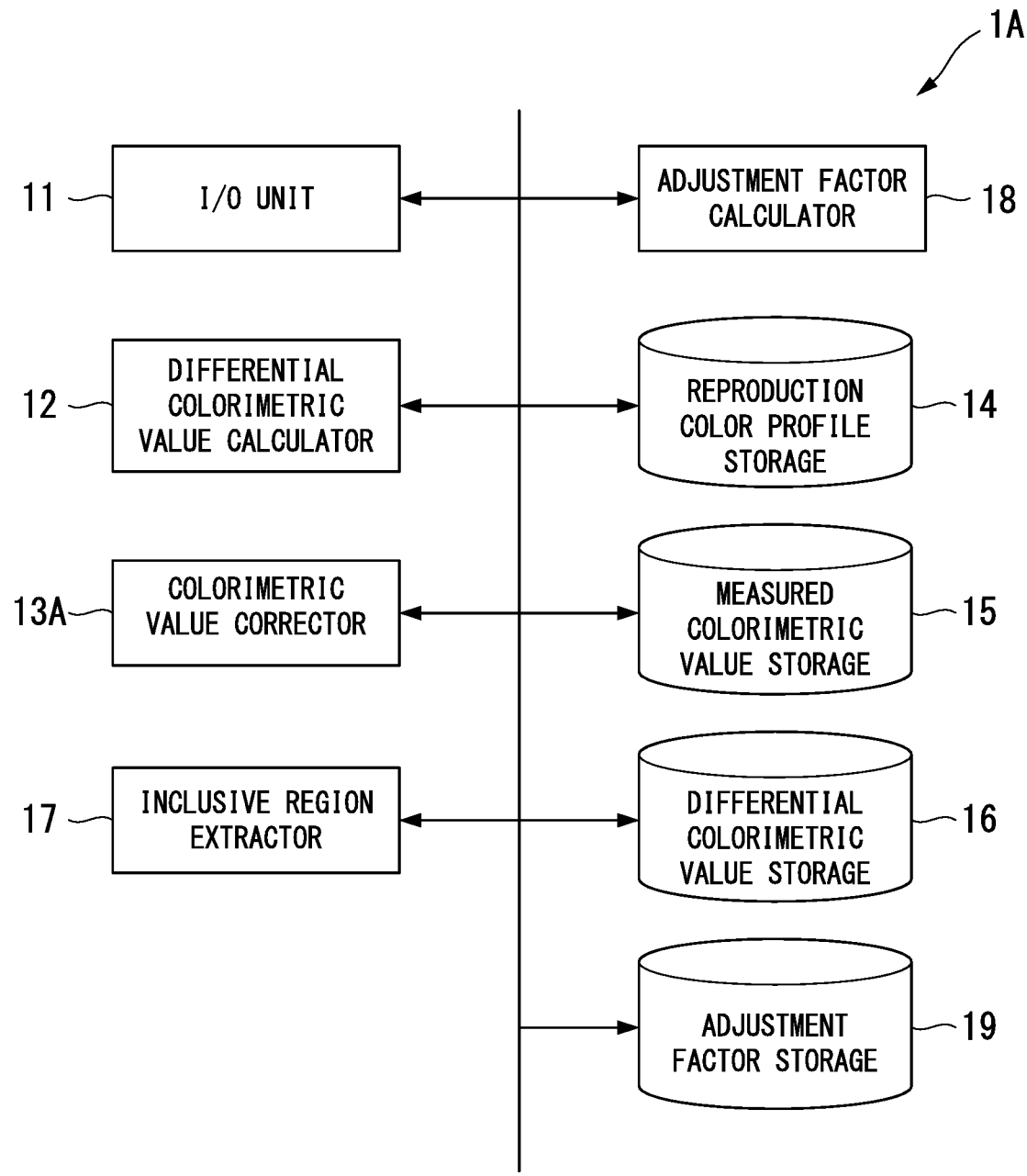
FIG. 5 is a block diagram illustrating an exemplary configuration of a reproduction color profile correction system 1A according to a second embodiment of the present invention.

FIG. 5 is a block diagram illustrating an exemplary configuration of a reproduction color profile correction system (reproduction color profile correction device) 1A according to the second embodiment of the present invention.

In FIG. 5, the reproduction color profile correction system 1A includes each of an I/O unit 11, a differential colorimetric value calculator 12, a colorimetric value corrector 13A, a reproduction color profile storage 14, a measured colorimetric value storage 15, a differential colorimetric value storage 16, an inclusive region extractor 17, an adjustment factor calculator 18, and an adjustment factor storage 19. Components similar to those of the first embodiment will be denoted by the same reference signs, and description thereof will be omitted. Hereinafter, components and operations different from those of the first embodiment will be described.

Additionally, in the present embodiment, a space in which colorimetric values are indicated will be described as an L*a*b* color space in a manner similar to the first embodiment.

The inclusive region extractor 17 generates, for each spot color ink combination of an ink combination, distribution of coordinate values corresponding to colorimetric values each obtained by a process ink combination in the L*a*b* color space. In the present embodiment, for example, one type of spot color ink is used in a spot color ink combination, and each spot color ink combination has a different control value of this one type of spot color. A dot percentage is used as a control value, and the spot color ink combinations are combinations in which dot percentages of the one type of the spot color ink are set to 0%, 40%, 70% and 100%. The inclusive region extractor 17 extracts, from a reproduction color profile table in the reproduction color profile storage 14, ink combinations each having the same spot color ink combination, and distributes colorimetric values of the extracted spot color ink combinations in the L*a*b* color space. In the present embodiment, distribution is performed not by extracting all of the ink combinations each having the same spot color ink combination but by extracting a combination in which a dot percentage of each of process inks of CMY components is any one of 0%, 50%, and 100% in the process ink combination.

FIGS. 6A to 6D are diagrams illustrating distribution of predicted colorimetric values obtained by an ink combination including a process ink combination and a spot color ink combination using yellowish green as the spot color ink. Here, yellowish green belongs to a relatively pale color category among spot color inks.

Figure 6A:
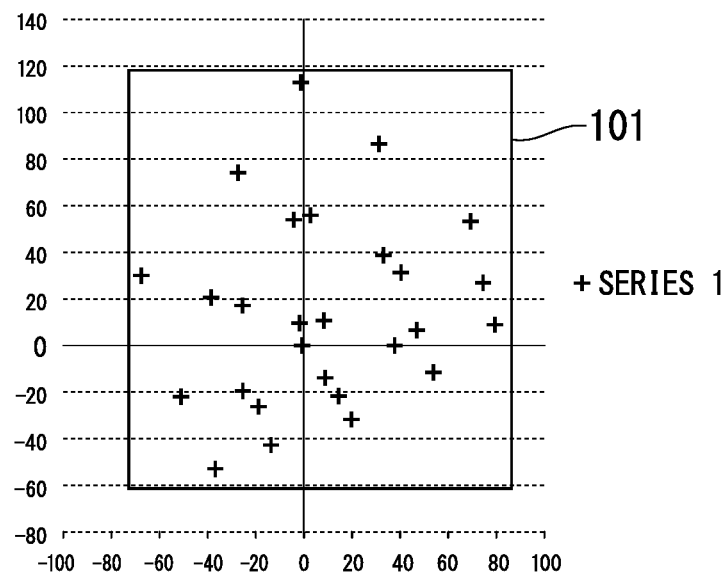
FIG. 6A is a diagram illustrating distribution of predicted colorimetric values each obtained by an ink combination including a process ink combination and a spot color ink combination using yellowish green as the spot color ink.

In FIG. 6A, predicted colorimetric values of combinations obtained by combining any one of dot percentages of "0%", 50%, and 100% as a dot percentage of each of process inks of CMY color components in a case where a dot percentage of the yellowish green spot color ink is "0%" are used. FIG. 6A illustrates a distribution diagram in which distribution of the predicted colorimetric values in the L*a*b* color space is projected on a two-dimensional a*b* coordinate system formed of an a* axis and a b* axis.

Figure 6B:
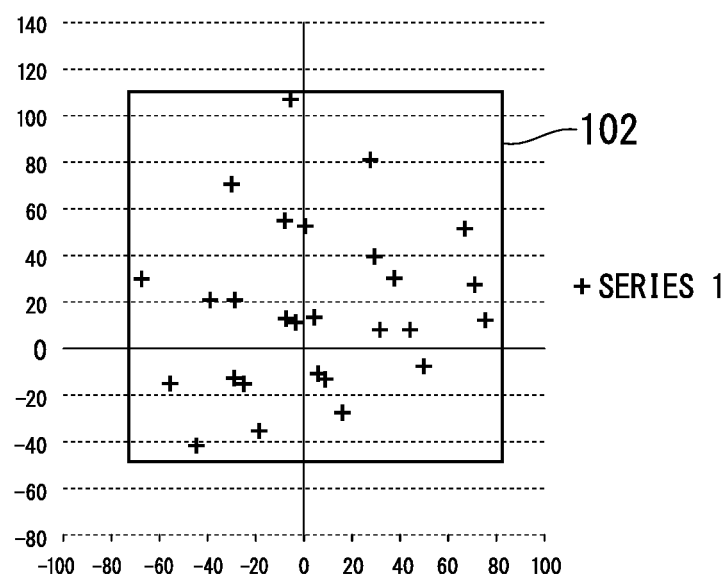
FIG. 6B is a diagram illustrating distribution of predicted colorimetric values each obtained by an ink combination including a process ink combination and a spot color ink combination using yellowish green as the spot color ink.

In FIG. 6B, predicted colorimetric values of combinations obtained by combining any one of dot percentages of "0%", 50%, and 100% as a dot percentage of each of the process inks of CMY color components in a case where a dot percentage of the yellowish green spot color ink is "40%" are used. FIG. 6B illustrates a distribution diagram in which distribution of the predicted colorimetric values in the L*a*b* color space is projected on the two-dimensional a*b* coordinate system in a manner similar to FIG. 6A.

Figure 6C:
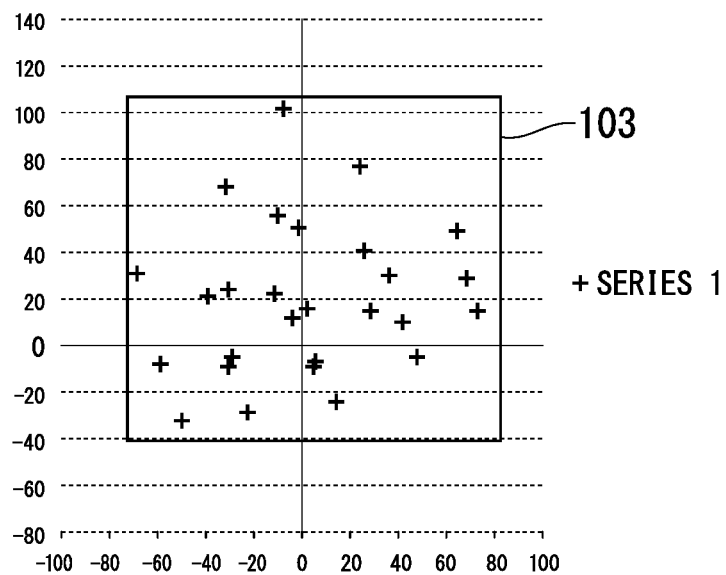
FIG. 6C is a diagram illustrating distribution of predicted colorimetric values each obtained by an ink combination including a process ink combination and a spot color ink combination using yellowish green as the spot color ink.

In FIG. 6C, predicted colorimetric values of combinations obtained by combining any one of dot percentages of "0%", 50%, and 100% as a dot percentage of each of the process inks of CMY color components in a case where a dot percentage of the yellowish green spot color ink is "70%" are used. FIG. 6C illustrates a distribution diagram in which the distribution of the predicted colorimetric values in the L*a*b* color space is projected on the two-dimensional a*b* coordinate system.

Figure 6D:
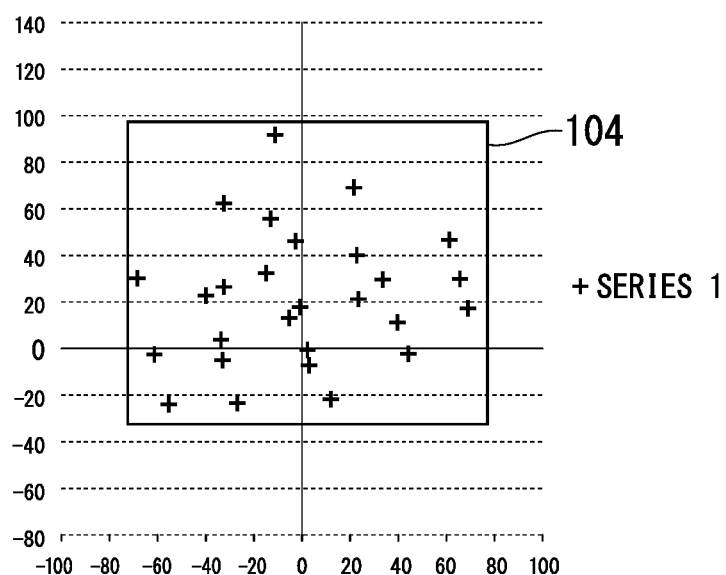
FIG. 6D is a diagram illustrating distribution of predicted colorimetric values each obtained by an ink combination including a process ink combination and a spot color ink combination using yellowish green as the spot color ink.

In FIG. 6D, predicted colorimetric values of combinations obtained by combining any one of dot percentages of "0%", 50%, and 100% as a dot percentage of each of process inks of CMY color components in a case where a dot percentage of the yellowish green spot color ink is "100%" are used. FIG. 6D illustrates a distribution diagram in which the distribution of the predicted colorimetric values in the L*a*b* color space is projected on the two-dimensional a*b* coordinate system.

From each of FIGS. 6A to 6D, it is possible to detect, for each spot color ink combination having a different control value of the spot color ink, a dispersion degree of the predicted colorimetric values of the ink combinations each obtained by combining a dot percentage of a process ink in a process ink combination. In other words, a degree of influence of a change in a dot percentage of each yellowish green spot color ink combination on a magnitude of dispersion in distribution of colorimetric values for each process ink combination is detected.

A minimum rectangular inclusive region surrounding the distribution of the projected colorimetric values is formed in each of FIGS. 6A to 6D, and the above-described degree of influence is acquired on the basis of a length of a diagonal line in each of inclusive regions (101, 102, 103, and 104).

In the present embodiment, the adjustment factor calculator 18 divides the length of the diagonal line in each of the inclusive region 101 having the dot percentage "0%" of the spot color ink combination, the inclusive region 102 having the dot percentage "40%" of the spot color ink combination, the inclusive region 103 having the dot percentage "70%" of the spot color ink combination, and the inclusive region 104 having the dot percentage "100%" of the spot color ink combination by the length of the diagonal line of the inclusive region 101 in the case where the dot percentage of the spot color ink combination is "0%", and calculates, an adjustment factor indicating the degree of influence of a change in the dot percentage of the spot color ink on the dispersion in the distribution of the colorimetric values for each process ink combination.

FIGS. 7A to 7D are diagrams illustrating distribution of predicted colorimetric values obtained by an ink combination including a process ink combination and a spot color ink combination using brown as the spot color ink. Here, brown belongs to a relatively dark color category among the spot color inks.

Figure 7A:
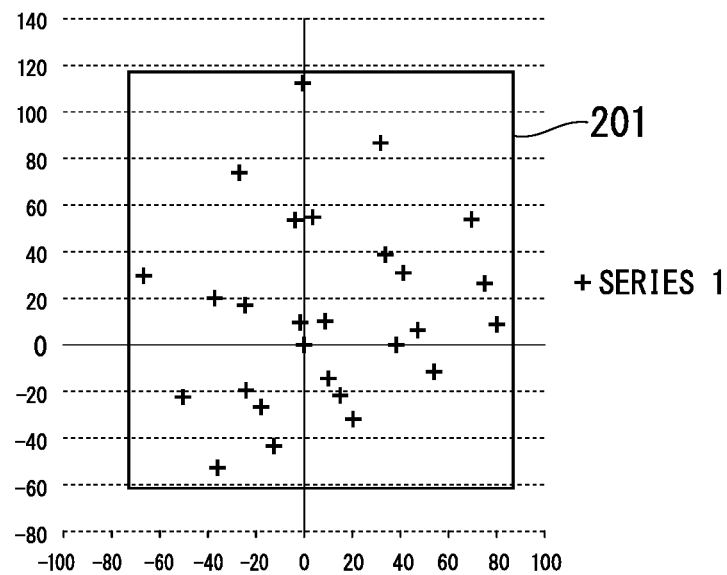
FIG. 7A is a diagram illustrating distribution of predicted colorimetric values each obtained by an ink combination including a process ink combination and a spot color ink combination using brown as the spot color ink.

In FIG. 7A, predicted colorimetric values of combinations obtained by combining any one of dot percentages of "0%", 50%, and 100% as a dot percentage of each of process inks of CMY color components in a case where a dot percentage of the brown spot color ink is "0%" are used. FIG. 7A illustrates a distribution diagram in which distribution of the predicted colorimetric values in the L*a*b color space is projected on a two-dimensional a*b* coordinate system.

Figure 7B:
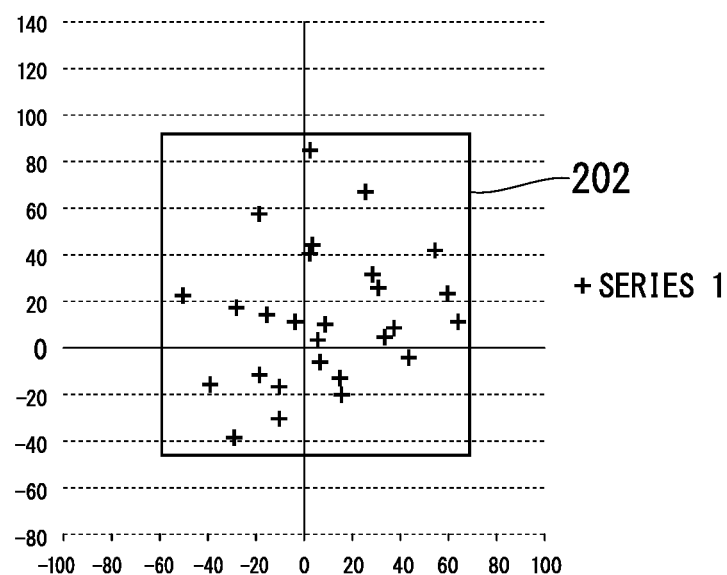
FIG. 7B is a diagram illustrating distribution of predicted colorimetric values each obtained by an ink combination including a process ink combination and a spot color ink combination using brown as the spot color ink.

In FIG. 7B, predicted colorimetric values of combinations obtained by combining any one of dot percentages of "0%", 50%, and 100% as a dot percentage of each of the process inks of CMY color components in a case where a dot percentage of the brown spot color ink is "40%" are used. FIG. 7B illustrates a distribution diagram in which distribution of the predicted colorimetric values in the L*a*b color space is projected on the two-dimensional a*b* coordinate system.

Figure 7C:
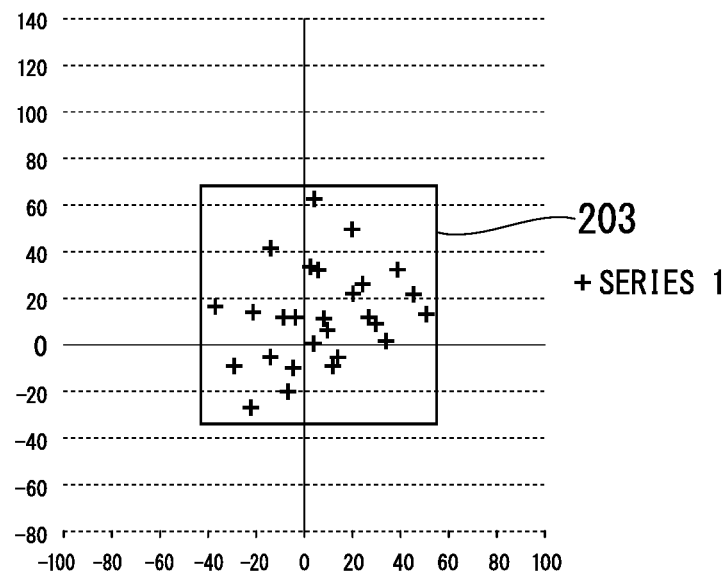
FIG. 7C is a diagram illustrating distribution of predicted colorimetric values each obtained by an ink combination including a process ink combination and a spot color ink combination using brown as the spot color ink.

In FIG. 7C, predicted colorimetric values of combinations obtained by combining any one of dot percentages of "0%", 50%, and 100% as a dot percentage of each of the process inks of CMY color components in a case where a dot percentage of the brown spot color ink is "70%" are used. FIG. 7C illustrates a distribution diagram in which distribution of the predicted colorimetric values in the L*a*b color space is projected on the two-dimensional a*b* coordinate system.

Figure 7D:
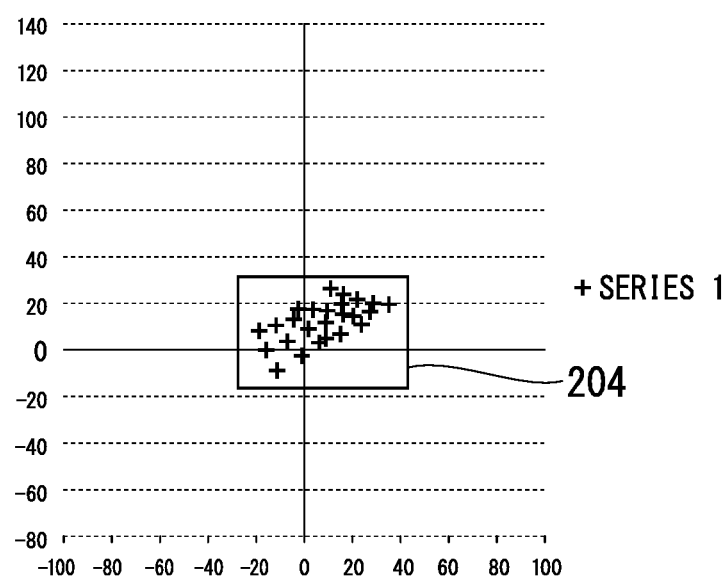
FIG. 7D is a diagram illustrating distribution of predicted colorimetric values each obtained by an ink combination including a process ink combination and a spot color ink combination using brown as the spot color ink.

In FIG. 7D, predicted colorimetric values of combinations obtained by combining any one of dot percentages of "0%", 50%, and 100% as a dot percentage of each of the process inks of CMY color components in a case where a dot percentage of the brown spot color ink is "100%" are used. FIG. 7D illustrates a distribution diagram in which distribution of the predicted colorimetric values in the L*a*b color space is projected on the two-dimensional a*b* coordinate system.

From each of FIGS. 7A to 7D, it is possible to detect, for each spot color ink combination having a different control value of the spot color ink, a dispersion degree of the predicted colorimetric values of the ink combinations each obtained by combining a dot percentage of a process ink in a process ink combination. In other words, a degree of influence of a change in a dot percentage of each brown spot color ink combination on a magnitude of dispersion in distribution of colorimetric values for each process ink combination is detected.

A rectangular inclusive region surrounding the projected distribution is formed in each of FIGS. 7A to 7D, and the above-described degree of influence is acquired on the basis of a length of a diagonal line in each of inclusive regions (201, 202, 203, and 204).

In the present embodiment, the adjustment factor calculator 18 divides the length of the diagonal line in each of the inclusive region 201 having the dot percentage "0%" of the spot color ink combination, the inclusive region 202 having the dot percentage "40%" of the spot color ink combination, the inclusive region 203 having the dot percentage "70%" of the spot color ink combination, and the inclusive region 204 having the dot percentage "100%" of the spot color ink combination by the length of the diagonal line of the inclusive region 201 in the case where the dot percentage of the spot color ink combination is "0%", and calculates an adjustment factor indicating the degree of influence of a change in the dot percentage of the spot color ink on the dispersion in the distribution of the colorimetric values.

Figures 8A, 8B, 9:
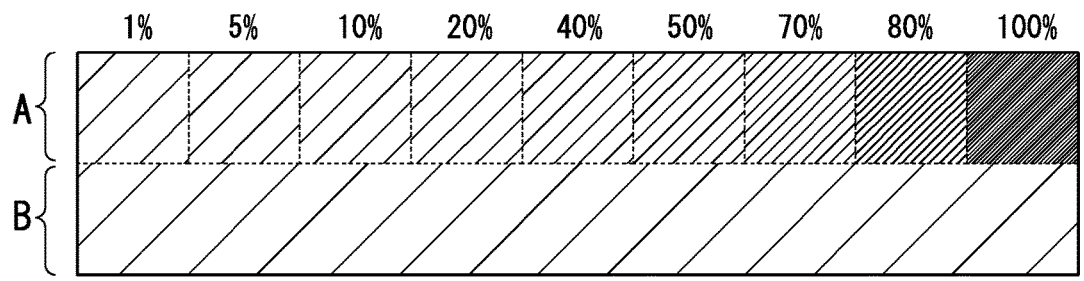
FIG. 8A is a diagram illustrating exemplary constituents of an adjustment table representing adjustment factors for respective control values of a spot color ink.
FIG. 8B is a diagram illustrating exemplary constituents of an adjustment table representing adjustment factors for respective control values of a spot color ink.
FIG. 9 is a diagram illustrating an evaluation chart to compare a reproduction color by a spot color ink with a reproduction color by a process ink.

FIGS. 8A and 8B are diagrams illustrating exemplary constituents of an adjustment factor table representing adjustment factors for respective control values of a spot color ink. FIG. 8A illustrates the adjustment factor table in a case of calculating the adjustment factors when the spot color ink is yellowish green and when the dot percentages (control values of the spot color ink) are 0%, 20%, 40%, 60%, 80%, and 100% as described with reference to FIGS. 6A to 6D. In FIG. 8A, respective adjustment factors are 1.00, 0.98, 0.96, 0.94, 0.91, and 0.88 relative to the respective yellowish green dot percentages 0%, 20%, 40%, 60%, 80%, and 100%. It can be seen that a larger control value of the spot color ink results in a smaller adjustment factor, and the degree of influence (degree of reflection) of a change in a control value of a process ink on a magnitude of dispersion of the ink combinations is reduced. In other words, it can be seen that a differential colorimetric value ($\Delta L_1$, $\Delta a_1$, and $\Delta b_1$) that changes a predicted colorimetric value is required to be changed per control value of the spot color ink at the time of replacing a predicted colorimetric value of a process ink with a measured colorimetric value thereof.

FIG. 8B illustrates the adjustment factor table in a case of calculating the adjustment factors when the spot color ink is brown and when the dot percentages (control values of the spot color ink) are 0%, 20%, 40%, 60%, 80%, and 100% as described with reference to FIGS. 6A to 6D. In FIG. 8B, respective adjustment factors are 1.00, 0.88, 0.75, 0.60, 0.33, and 0.03 relative to the respective brown dot percentages 0%, 20%, 40%, 60%, 80%, and 100%. Similar to the case of yellowish green, it can be seen that a larger control value of the spot color ink results in a smaller adjustment factor, and the degree of influence of a change in the control value of the process ink on a magnitude of dispersion of the ink combinations is reduced. In other words, it can be seen that a differential colorimetric value ($\Delta L_1$, $\Delta a_1$, $\Delta b_1$) that changes a predicted colorimetric value is required to be changed per control value of the spot color ink at the time of replacing a predicted colorimetric value of a process ink with a measured colorimetric value thereof.

In FIGS. 8A and 8B, the adjustment factors relative to the respective dot percentages of brown are lower than those relative to yellowish green, comparing the respective adjustment factor tables between the cases where the spot color inks are yellowish green and brown.

From this fact, it can be understood that an adjustment factor needs to be calculated not only for each control value but also for each spot color ink.

Therefore, in the present embodiment, an adjustment factor corresponding to a combination of control values in a spot color ink combination is calculated for each spot color ink. Additionally, in the present embodiment, the example of using only one type of a spot color ink has been described, but in a case of combining a plurality of different types thereof, an adjustment factor is calculated for each combination of control values for each of the spot color inks to be combined. For example, in the case of combining yellowish green with brown, an adjustment factor is calculated for each spot color ink combination in which yellowish green having a dot percentage of any one of 0%, 40%, 70%, and 100% is combined with brown having a dot percentage of any one of 0%, 40%, 70%, and 100%.

Returning to FIG. 5, the adjustment factor calculator 18 calculates, for each spot color ink combination that is a combination of control values of each of the spot color inks to be combined, an adjustment factor corresponding to a spot color ink combination that is a combination of control values of a spot color ink, and generates an adjustment factor table for each spot color ink combination. Then, the adjustment factor calculator 18 writes and stores the generated adjustment factor table in the adjustment factor storage 19 for each spot color ink or each combination of spot color inks.

The colorimetric value corrector 13A retrieves, from the adjustment factor table in the adjustment factor storage 19, an adjustment factor corresponding to a spot color ink combination of an ink combination for a predicted colorimetric value to be corrected at the time of correcting the predicted colorimetric value by using a differential colorimetric value.

Then, the colorimetric value corrector 13A retrieves a differential colorimetric value ($\Delta L_1$, $\Delta a_1$, $\Delta b_1$) corresponding to the predicted colorimetric value to be corrected, and generates an adjusted differential colorimetric value ($\Delta L_1'$, $\Delta a_1'$, $\Delta b_1'$) by multiplying the differential colorimetric value ($\Delta L_1$, $\Delta a_1$, $\Delta b_1$) by the adjusted factor. The colorimetric value corrector 13A adds the generated adjustment differential colorimetric value to the predicted colorimetric value to be corrected. Here, each of $\Delta L_1'$, $\Delta a_1'$, $\Delta b_1'$ is a multiplication result obtained by multiplying each of $\Delta L_1$, $\Delta a_1$, $\Delta b_1$ by the adjustment factor. The colorimetric value corrector 13A performs correction for the predicted colorimetric value by overwriting the predicted colorimetric value ($L_{1\_n}$, $a_{1\_n}$, $b_{1\_n}$) to be corrected with a corrected colorimetric value ($L_{1\_n}'$, $a_{1\_n}'$, $b_{1\_n}'$) obtained by the addition in the reproduction color profile table in the reproduction color profile storage 14.

As described above, in the present embodiment, in the case of correcting each predicted colorimetric value of an ink combination by using a differential colorimetric value, an adjustment factor is preliminarily calculated for each spot color ink combination, and an adjusted differential colorimetric value is generated by multiplying the adjustment factor corresponding to the spot color ink combination of the ink combination by a differential colorimetric value corresponding to a process ink combination. Consequently, according to the present embodiment, since the predicted colorimetric value is corrected by the calculated adjusted differential colorimetric value, a degree of influence of a change in a process ink corresponding to a spot color ink combination can be reflected in a corrected colorimetric value, and compared to the first embodiment, correction that can achieve higher conformity between a case of using only process inks and a case of using a combination of a process ink and a spot color ink can be performed.

As described above, in the present embodiment, the adjustment factor calculator 18 uses, at the time of calculating an adjustment factor, a length of a diagonal line of a rectangular inclusive region including distribution obtained by projecting distribution of predicted colorimetric values in the L*a*b* color space onto the two-dimensional a*b* coordinate system for each process ink combination based on a dot percentage of a spot color ink.

However, the adjustment factor calculator 18 may also calculate an adjustment factor by using the area of the rectangular inclusive region or a perimeter of the inclusive region.

Additionally, the adjustment factor calculator 18 may also calculate an adjustment factor by using the volume, surface area, or a length of a diagonal line of an inclusive region while setting, as the inclusive region, a minimum rectangular parallelepiped shape including distribution of predicted colorimetric values in the L*a*b* color space.

Additionally, the adjustment factor calculator 18 may also calculate an adjustment factor by using the volume, surface area, or a length of a longest diameter (length of transverse axis) of an inclusive region while setting, as the inclusive region, a minimum three-dimensional curved surface including all of predicted colorimetric values distributed in the L*a*b* color space.

Furthermore, the adjustment factor calculator 18 may also calculate an adjustment factor by using the area of an inclusive region, a perimeter thereof, or a longest diameter thereof while projecting a minimum three-dimensional curved surface including all of predicted colorimetric values distributed in the L*a*b* color space on a two-dimensional a*b* coordinate system and setting this projected two-dimensional shape as the inclusive region.

Moreover, in the first embodiment and the second embodiment, the I/O unit 11 actually performs measurement on a color chart for each target process ink combination, and reads, as measured colorimetric values, measured values obtained through the measurement as described in step S12 and the like. However, the input/output device 11 does not constantly need to measure colorimetric values for all of the process ink combinations and read these colorimetric values that is described in the first embodiment and the second embodiment. For example, a limited (relatively large) number of color charts (for example, about 1000 colors of IT8 (a set of standards for color communications and control specifications of the American National Standards Institute) target) are measured, and a CMYK profile is created by a general method on the basis of the measured colorimetric values obtained from this measurement. Then, the I/O unit 11 may read the CMYK profile and retrieve colorimetric values corresponding to a process ink combination from the CMYK profile, and may use the retrieved colorimetric values as measured colorimetric values.

Note that it may also be possible to control correction for a colorimetric value in a reproduction color profile by: recording, in a computer-readable medium, a program to implement the respective functions of the reproduction color profile correction system 1 of FIG. 1 and the reproduction color profile correction system 1A of FIG. 5 according to the present invention; causing a computer system to read the program recorded in the recording medium; and then executing the program. Note that the "computer system" referred to here includes hardware such as an OS and peripheral devices.

Additionally, note that the "computer system" also includes a WWW system having a website providing environment (or display environment). Additionally, the "computer-readable recording medium" represents: portable media such as a flexible disk, a magneto optical disk, a ROM, and a compact disk (CD)-ROM; and a storage device such as a hard disk included in the computer system. Furthermore, the "computer-readable recording medium" includes a recording medium that holds a program for a predetermined period, like a volatile memory (RAM) inside a computer system to be a server or a client in a case where a program is transmitted via a communication line such as a network like the Internet or a telephone line.

Additionally, the above-described program may also be transmitted to other computer systems via a transmission medium or transmitted waves in the transmission medium from the computer system storing the program in a storage device and the like. Here, the "transmission medium" represents a medium having a function of transmitting information, like a network such as the Internet (communication network) or a communication line (communication wire) such as a telephone line. Additionally, the above-described program may implement some of the above-described functions. Furthermore, the above-described program may also be a so-called differential file (differential program) that can implement the above-described functions by being combined with a program already recorded in the computer system.

What is claimed is:

1. A reproduction color profile correction device which corrects a colorimetric value of a reproduction color in a reproduction color profile, in which the reproduction color is reproduced by an ink combination including a process ink combination that is a combination of control values of process inks, the ink combination further including a spot color ink combination that is a combination of control values of a spot color ink, the reproduction color profile correction device comprising:
    a differential colorimetric value calculator which calculates a differential colorimetric value that is a difference between a predicted colorimetric value and a measured colorimetric value, the predicted colorimetric value being a colorimetric value of a predicted reproduction color corresponding to the process ink combination of the ink combination, and the measured colorimetric value being a colorimetric value obtained by measuring a reproduction color in a color chart corresponding to the process ink combination;
    a colorimetric value corrector which corrects, by using the differential colorimetric value, a predicted colorimetric value of a reproduction color reproduced by the ink combination;
    an inclusive region extractor which extracts, for each dot percentage of a spot color ink, an inclusive region including colorimetric values of the process ink combination having different control values of respective process inks in the ink combination, the colorimetric values being distributed in a predetermined color space; and
    an adjustment factor calculator which calculates, for each control value of the spot color ink, an adjustment factor to be multiplied by the differential colorimetric value based on a size of the inclusive region.

2. The reproduction color profile correction device according to claim 1, wherein the colorimetric value corrector corrects the predicted colorimetric value of the reproduction color in the ink combination having the spot color ink combination by multiplying the differential colorimetric value by the adjustment factor corresponding to the spot color ink combination.

3. The reproduction color profile correction device according to claim 1, wherein the adjustment factor calculator calculates the adjustment factor by dividing a size of an inclusive region for each dot percentage of the spot color ink by a reference value while setting, as the reference value, a size of an inclusive region in a case where a dot percentage of the spot color ink combination is "0", and the size of the inclusive region includes colorimetric values distributed in a predetermined color space and belonging to combinations having different control values of process inks.

4. The reproduction color profile correction device according to claim 1, wherein the size of the inclusive region is volume of the inclusive region in the predetermined color space.

5. The reproduction color profile correction device according to claim 1, wherein the size of the inclusive region is area of a projected plane when the inclusive region in the predetermined color space is projected on a two-dimensional plane.

6. The reproduction color profile correction device according to claim 1, wherein the size of the inclusive region is a length of a diagonal line of a rectangular parallelepiped including distribution of colorimetric values in the predetermined color space.

7. A reproduction color profile correction method which corrects a colorimetric value of a reproduction color in a reproduction color profile, in which the reproduction color is reproduced by an ink combination including a process ink combination that is a combination of control values of process ink the ink combination further including a spot color ink combination that is a combination of control values of a spot color ink, the reproduction color profile correction method comprising:
    by a processor,
        calculating a differential colorimetric value that is a difference between a predicted colorimetric value and a measured colorimetric value, the predicted colorimetric value being a colorimetric value of a predicted reproduction color corresponding to the process ink combination of the ink combination, and the measured colorimetric value being a colorimetric value obtained by measuring a reproduction color in a color chart corresponding to the process ink combination;
        correcting, by using the differential colorimetric value, a predicted colorimetric value of a reproduction color reproduced by the ink combination;
        extracting, for each dot percentage of a spot color ink, an inclusive region including colorimetric values of the process ink combination having different control values of respective process inks in the ink combination, the colorimetric values being distributed in a predetermined color space; and calculating, for each control value of the spot color ink, an adjustment factor to be multiplied by the differential colorimetric value based on a size of the inclusive region.

8. A computer-readable medium including a reproduction color profile correction program causing a computer to function as a reproduction color profile correction system which corrects a colorimetric value of a reproduction color in a reproduction color profile, in which the reproduction color is reproduced by an ink combination including a process ink combination that is a combination of control values of process inks, the process ink combination further including and a spot color ink combination that is a combination of control values of a spot color ink, the reproduction color profile correction program causing the computer to execute the reproduction color profile correction method including:

calculating a differential colorimetric value that is a difference between a predicted colorimetric value and a measured colorimetric value, the predicted colorimetric value being a colorimetric value of a predicted reproduction color corresponding to the process ink combination of the ink combination, and the measured colorimetric value being a colorimetric value obtained by measuring a reproduction color in a color chart corresponding to the process ink combination;

correcting, by using the differential colorimetric value, a predicted colorimetric value of a reproduction color reproduced by the ink combination;

extracting, for each dot percentage of a spot color ink, an inclusive region including colorimetric values of the process ink combination having different control values of respective process inks in the ink combination, the colorimetric values being distributed in a predetermined color space; and calculating, for each control value of the spot color ink, an adjustment factor to be multiplied by the differential colorimetric value based on a size of the inclusive region.

\* \* \* \* \*